Aug. 26, 1969 R. W. DANIELS 3,463,542
SWING-AWAY SEAT
Filed April 22, 1968

Inventor
Russell W. Daniels
By Charles A. Schunk
Attorney

United States Patent Office 3,463,542
Patented Aug. 26, 1969

3,463,542
SWING-AWAY SEAT
Russell W. Daniels, Park Forest, Ill., assignor to Allis-Chalmers Manufacturing Company, Milwaukee, Wis.
Filed Apr. 22, 1968, Ser. No. 723,035
Int. Cl. B60n 1/04, 1/02
U.S. Cl. 296—65
3 Claims

ABSTRACT OF THE DISCLOSURE

A seat support member is pivotally connected at its front end to the vehicle chassis for forward swinging movement and is pivotally connected at one lateral side to the operator's seat for tilting to one side. The seat may be swung forwardly and to one side of the steering wheel, in which position it will not interefere with removal of power apparatus, such as an electric storage battery of an electric lift truck.

---

This invention relates to a seat support which permits an operator's seat to be swung forwardly and to one side of the steering wheel in which position it will not interfere with upward removal of the battery of an electric lift truck.

In an electric lift truck, an operator's station is normally provided at the forward end of the lift truck and a battery is disposed at the rear of the lift truck. The operator's seat is normally positioned directly over the battery and thus when it is desired to lift the battery upwardly from the lift truck chassis, the seat must be moved out of the way. In some lift truck designs, the seat can be pivoted forwardly sufficiently far to permit the battery to be raised upwardly from the truck; however, in other lift truck designs, the position of the steering wheel in relation to the operator's seat is such that the seat cannot be pivoted forwardly far enough to be out of the way of the battery when it is raised vertically from the chassis. The present invention solves this problem by a double hinge arrangement permitting the seat to be swung to one lateral side of the steering wheel as it is pivoted forwardly from its normal position.

It is an object of this invention to provide a swing-away seat for an electric lift truck which permits the seat to be tilted to one side of the steering wheel where it will not interfere with upward removal of the power battery.

It is a further object of this invention to provide a seat support in an electric lift truck which permits the seat to be swung forwardly and to one side of the steering wheel without disconnecting any fastening means.

It is a further object of this invention to provide a swing-away operator's seat wherein a seat support member is pivotally supported at its forward end on a transverse axis and the seat is pivoted to the support member on a longitudinal axis so as to permit the seat to be swung to one lateral side of the steering wheel as the seat support member is tilted upwardly and forwardly.

These and other objects and advantages of the present invention will be apparent when the following description is read in conjunction with the drawings in which.

Figure 1:
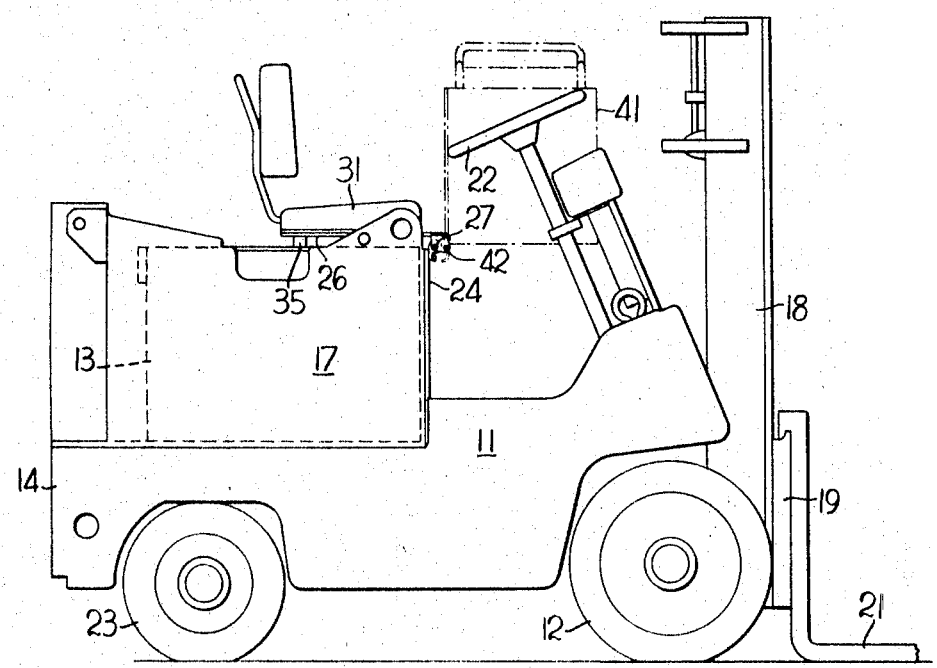
FIG. 1 is a side view of an electric lift truck in which the present invention is incorporated.

Referring to FIG. 1, the electric lift truck 11 includes a pair of front drive wheels 12 which are connected to an electric motor, not shown, in a conventional manner. Such electric motor receives its power from a battery 13 disposed in a combined battery case and counterweight assembly 17 positioned on the rear of the vehicle chassis 14. A steering wheel 22 is provided at the operator's station and controls a pair of rear steerable wheels 23 through linkage not shown. A mast 18 is provided on the front of the electric lift truck 11 and supports a carriage 19 having lift forks 21.

Figure 3:
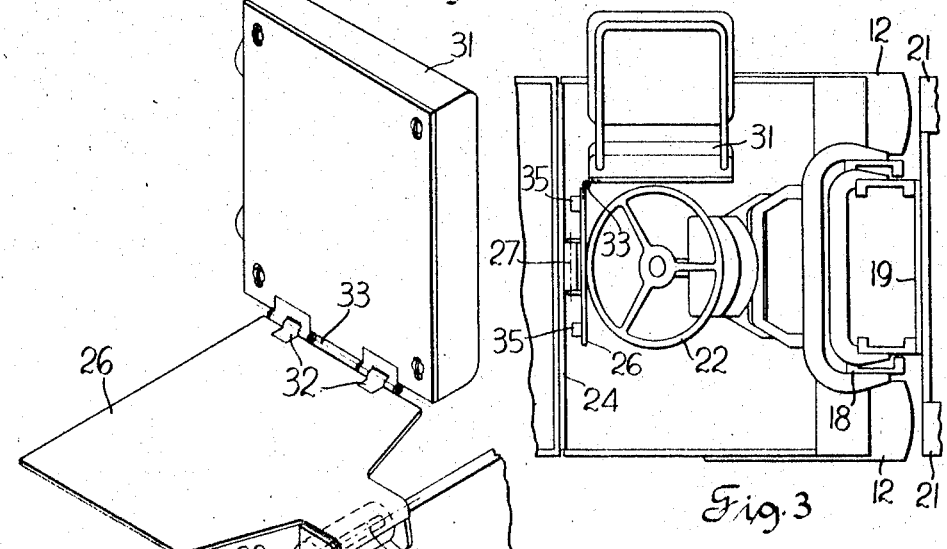
FIG. 3 is a top view of the operator's station of the lift truck of FIG. 1 with the seat pivoted to the left side of the steering wheel.
Figure 2:
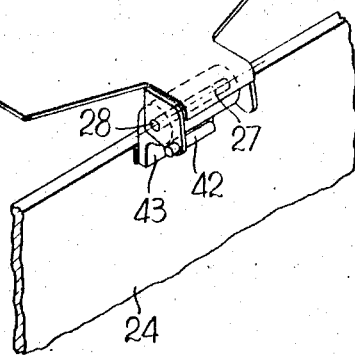
FIG. 2 is an isometric view of the seat support member showing its pivotal connection to the chassis and to the seat.

Referring also to FIGS. 2 and 3, the chassis 14 includes a rigid upright plate 24 to which a seat support member 26 is pivotally connected on a transverse pivot axis 27 by a pivot pin 28. The seat support member 26 is pivotally connected to an operator's seat 31 by hinge assemblies 32 on a tilt axis 33. The seat 31 is in its normal position, as is illustrated in solid lines in FIG. 1, rests on the support member 26 and is disposed above the battery case and counterweight assembly 17. The support member 26 includes a pair of pads 35 which, as shown in FIG. 1, rest on the top plate of the battery 13. In order to swing the seat out of the way, so that either the battery 13 or the combined battery and counterweight assembly 17 may be removed directly upwardly, the seat 31 is pivoted laterally to the left side about axis 33 and the support member 26 is pivoted forwardly about axis 27 to the position of phantom lines 41. This swing away position of the operator's seat is also shown in FIG. 3, wherein it will be noted that the axis 33 is now in a vertical position along with the support member 26. The support member 26 in its upright position rests against the steering wheel 22. It will be noted that the axis 33 is horizontally disposed in the normal position of the seat 31, as shown in FIG. 1, and always lies in a vertical longitudinal plane substantially at right angles to transverse axis 27.

A stop 42 is provided on the support member 26 which coacts with an abutment 43 on the upright plate 24 of the chassis when the support member 26 is swung forwardly and upwardly to its upright position. The stop 42 and abutment 43 serve as motion limiting means to prevent excessive force being applied to the steering wheel 22 by the seat support member 26.

Although a single embodiment of the present invention has been disclosed, it is obvious that other versions of this swing-away seat assembly could be provided.

The embodiments of the invention in which an exclusive property or privilege is claimed are defined as follows:

1. In an electric lift truck including a chassis, an operator's station at the front of said vehicle, a steering wheel at the operator's station, a battery supported on the rear of the chassis and an operator's seat normally disposed above the battery and at the rear of the steering wheel, a seat support comprising:

a seat support member pivotally connected at its forward end on a transverse pivot axis to said chassis for forward and upward tilting movement from its normal horizontal position to an upright position, and means pivotally connecting said operator's seat to one lateral side of said support member for pivotal movement about a tilt axis lying longitudinally of said truck when said support member is in its normal horizontal position, said seat being disposed to one lateral side of said steering wheel when said seat is pivoted laterally about said tilt axis and said support member is pivoted forwardly relative to said pivot chassis thereby permitting said battery to be raised vertically from said chassis without interference with the said seat and support member.

2. The invention of claim 1 wherein said seat rests on said support member in the normal position of said seat and support member.

3. The invention of claim 1 and further comprising stop means limiting forward pivoting of said support member relative to said chassis.

References Cited

UNITED STATES PATENTS

| 1,747,717 | 2/1930 | Hummert | 297—314 XR |
| 2,284,352 | 5/1942 | Zank | 248—376 |
| 2,563,277 | 8/1951 | Roeder, et al. | 248—387 XR |
| 2,815,064 | 12/1957 | Witzel | 248—376 |
| 2,840,140 | 6/1958 | Harrington | 248—376 |
| 2,877,825 | 3/1959 | Olson | 248—376 |
| 3,006,593 | 10/1961 | Plate et al. | 248—376 |

BOBBY R. GAY, Primary Examiner

GLENN O. FINCH, Assistant Examiner

U.S. Cl. X.R.

180—68.5; 248—376; 297—331